Dec. 11, 1923.
W. T. PECK
MERRY-GO-ROUND
Filed May 18, 1922
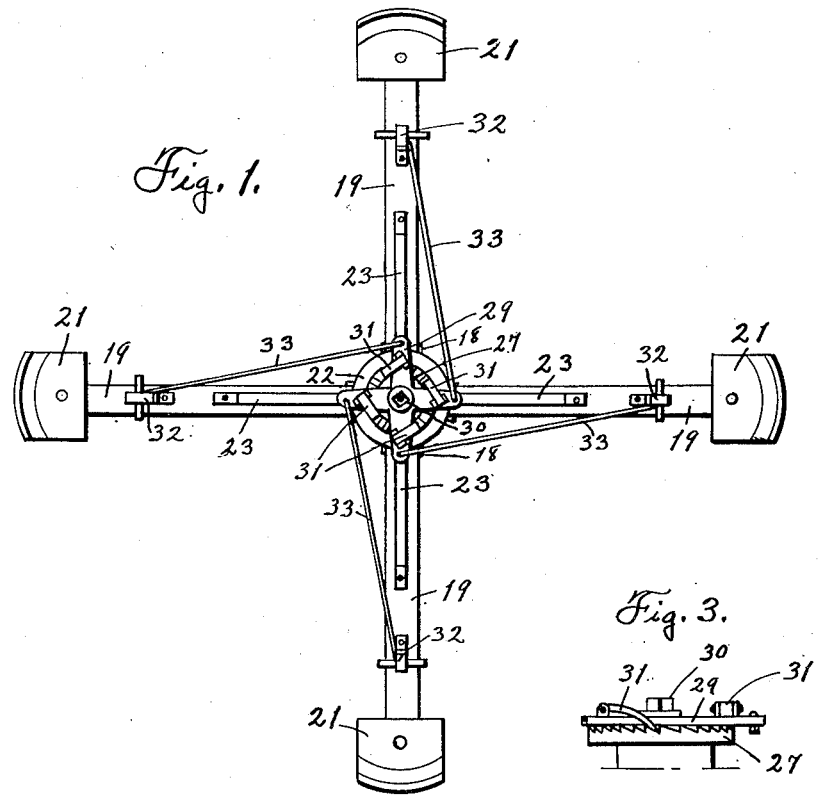
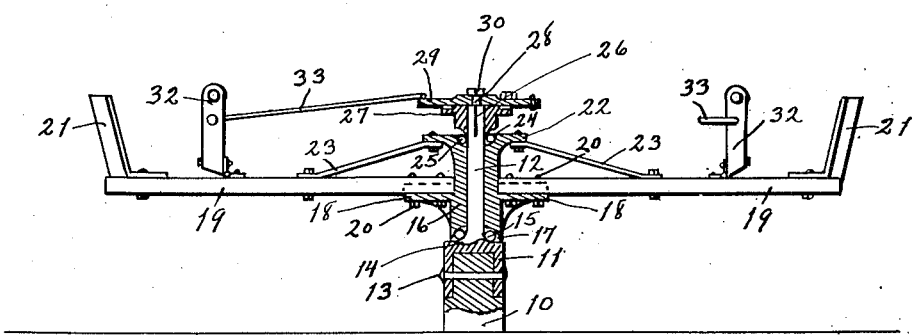
INVENTOR:
Willis T. Peck
By Silas L. Sweet Patented Dec. 11, 1923.

1,476,832

UNITED STATES PATENT OFFICE.

WILLIS T. PECK, OF FORT DES MOINES, IOWA.

MERRY-GO-ROUND.

Application filed May 18, 1922. Serial No. 562,046.

*To all whom it may concern:*

Be it known that I, WILLIS T. PECK, a citizen of the United States of America, and resident of Fort Des Moines, Polk County, Iowa, have invented a new and useful Merry-Go-Round, of which the following is a specification.

An object of this invention is to provide an improved construction for a rotary playground apparatus.

A further object of this invention is to provide improved means whereby a merry-go-round may be operated by manual actuation of persons occupying the same.

My invention consists in the construction, arrangement and combination of elements hereinafter set forth, pointed out in the claims and illustrated by the accompanying drawing, in which—

Figure 1 is a plan view of my improved apparatus. Figure 2 is a side elevation of the same, partly in section. Figure 3 is a side elevation, on an enlarged scale, showing the pawl and ratchet operating devices.

In the construction of the device as shown the numeral 10 designates a base, support, post or standard, of any suitable size and material, which preferably is reduced in diameter at its upper end to carry an axle device comprising a socket 11 adapted to engage and fit such reduced portion, and a spindle 12 carried in vertical position by said socket. The socket 11 may be secured in position by means of one or more bolts 13. The top of the socket 11 is formed with an external ball race 14 circumferentially of the base of the spindle 12 and bearing balls 15 are adapted to travel therein. A sleeve 16 is mounted for rotation on the spindle 12 and is formed at its lower end with an internal ball race 17 adapted to cooperate with the race 14 and balls 15. The sleeve 16 is formed intermediate of its ends with a plurality of socket arms 18, in this instance four in number, projecting radially in a horizontal plane and preferably being composed in the main of upwardly opening channels. A plurality of beams 19 are provided, one for each socket arm 18, and said beams are engaged at their inner ends in said socket arms and suitably secured thereto as by bolts 20. The beams 19 project radially material distances from the axis of the device, in a horizontal plane, and carry at their outer ends suitable seats 21. The sleeve 16 is formed with a peripheral flange 22 at its upper end, and each beam 19 is suitably braced to said flange as by inclined braces 23. At its upper end the sleeve 16 is also formed with an internal ball race 24 adapted to contain a collection of bearing balls 25 bearing against the spindle 12 and tending to prevent undesirable wabbling of the sleeve in its rotary movement. The upper end portion of the spindle 12 is squared, or formed angular in cross-section, at 26, and a ratchet wheel 27, having ratchet teeth on its upper face, is formed with an angular bore fitting to said angular portion, whereby said ratchet wheel is supported and held against rotation. Above the squared portion 26 the spindle is formed circular in cross-section, at 28, and a spider 29 is rotatably mounted on such portion just above the ratchet wheel 27. A nut 30, or other suitable securing means, is mounted on the projecting upper end of the spindle 12 and holds the spider and ratchet wheel in place thereon. A gravity pawl 31 is pivoted on each arm of the spider 29 and said pawls in this instance are four in number, and each engages the teeth of the ratchet wheel 27. A suitable hand lever 32 is pivoted on each of the beams 19 adjacent the seat 21 thereon, and said levers are movable through arcs in vertical planes intersecting said beams; that is to say, they may be oscillated toward and away from the respective seats 21. Each lever 32 is pivotally connected by a link 33 to an arm of the spider 29, so that said spider may be rotated by oscillation of one or more of said levers.

In practical use one or more of the seats are occupied and the occupants oscillate the levers 32 toward and away from themselves in unison, thus causing a rotary oscillation of the spider 29 on the spindle. The pawls 31 are drawn back and forth over the face of the stationary ratchet wheel 27, in one direction idly and in the other direction engaging and exerting pressure against the teeth of said wheel. The reaction of such pressure, applied through the pawls 31, spider 29, links 33 and levers 32, causes a rotary movement of the beams 19, the sleeve 16 rotating on the spindle 12 supported in anti-friction relation by the bearing balls 15 and the base.

Any suitable covering or housing means may be provided, if desired, for the ratchet wheel and pawls, to prevent injury to those occupying or experimenting with the device.

I claim as my invention—

1. A merry-go-round comprising a base, a vertical spindle thereon, a sleeve rotatably mounted on said spindle, beams secured to and radiating from said sleeve, a ratchet wheel mounted in stationary position, a member rotatably mounted on said spindle above said sleeve, pawls pivoted on said member and adapted to engage said ratchet wheel, levers pivoted on said beams, and pivotal connections between said levers and pawl-carrying member.

2. A merry-go-round comprising a base, a vertical spindle thereon, a sleeve rotatably mounted on said spindle, beams secured to and radiating from said sleeve, a ratchet wheel formed with upwardly extending teeth mounted on said spindle above said sleeve and held against rotation, a spider rotatably mounted on said spindle above said ratchet wheel, pawls pivoted on said spider, depending between the arms thereof and adapted to engage said ratchet teeth, levers pivoted on and extending upwardly from said beams, and links wholly above the horizontal plane of said beams and pivotally connecting said levers to said spider.

3. A merry-go-round, comprising a base, a stationary vertical spindle thereon, a sleeve rotatably mounted on said spindle and formed with radial socket arms, beams secured to and radiating from said socket arms, each beam carrying a seat near its outer end, said sleeve having a flange on its upper end, braces connecting said beams and flange, a ratchet wheel non-rotatably secured to said spindle above said sleeve, a member rotatably mounted on said spindle above said ratchet, said ratchet wheel having teeth on its upper face, gravity pawls pivoted on said member and engaging the teeth of said ratchet, levers fulcrumed on said beams adjacent to and independent of said seats, and links wholly above said beams connecting said levers to said member.

4. A merry-go-round, comprising a base, a stationary socket thereon, a vertical spindle on said socket, a sleeve rotatably mounted on said spindle, bearing balls between the lower ends of said spindle and sleeve and carried by the socket head and adapted to support a load, bearing balls between said spindle and the upper end of said sleeve and adapted to prevent lateral oscillation thereof, said sleeve being formed with radial socket arms, beams fixed to and radiating from said arms, seats on said beams, levers fulcrumed on said beams adjacent to and wholly independent of said seats, a ratchet wheel non-rotatably secured to said spindle, a spider rotatably mounted on said spindle, pawls pivoted on said spider and adapted to engage the teeth of said ratchet wheel, and links pivotally connecting said levers to said spider, said links being wholly above the horizontal plane of said beams.

Signed at Des Moines, in the county of Polk and State of Iowa, this 15th day of April, 1922.

WILLIS T. PECK.